(12) United States Patent
Manire et al.

(10) Patent No.: US 8,622,423 B1
(45) Date of Patent: Jan. 7, 2014

(54) AIRBAG WITH HEAT SHIELD

(75) Inventors: Gregory B. Manire, Oxford, MI (US);
Daniel Bujaidar, Washington, MI (US);
Chang-Hwan Ju, Rochester, MI (US);
Carolynn Ann Burley, New Baltimore, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 13/610,305

(22) Filed: Sep. 11, 2012

(51) Int. Cl.
*B60R 21/217* (2011.01)

(52) U.S. Cl.
USPC ......... 280/740; 280/736; 280/730.2; 280/742

(58) Field of Classification Search
USPC .................. 280/740, 742, 736, 730.2
See application file for complete search history.

(56) References Cited

U.S. PATENT DOCUMENTS

| | | | |
|---|---|---|---|
| 5,149,130 A * | 9/1992 | Wooley et al. ............. | 280/743.1 |
| 5,378,011 A * | 1/1995 | Rogerson et al. .......... | 280/728.1 |
| 5,547,214 A * | 8/1996 | Zimmerman et al. ..... | 280/730.1 |
| 6,176,512 B1 * | 1/2001 | Rodriguez ................. | 280/728.2 |
| 6,270,113 B1 * | 8/2001 | Wipasuramonton et al. ......................... | 280/730.2 |
| 6,279,944 B1 * | 8/2001 | Wipasuramonton et al. ......................... | 280/730.2 |
| 6,361,067 B1 * | 3/2002 | Varcus et al. .............. | 280/729 |
| 6,802,529 B2 * | 10/2004 | Takedomi et al. ......... | 280/729 |
| 6,811,184 B2 * | 11/2004 | Ikeda et al. ................ | 280/742 |
| 6,866,292 B2 * | 3/2005 | Thomas ..................... | 280/730.2 |
| 6,962,364 B2 * | 11/2005 | Ju et al. ..................... | 280/730.2 |
| 7,243,941 B2 * | 7/2007 | Charpentier et al. ...... | 280/729 |
| 7,347,444 B2 * | 3/2008 | Wheelwright ............. | 280/729 |
| 7,404,572 B2 * | 7/2008 | Salmo et al. ............... | 280/729 |
| 7,407,185 B2 * | 8/2008 | Maripudi et al. ......... | 280/743.1 |
| 7,431,332 B2 * | 10/2008 | Wipasuramonton et al. ......................... | 280/730.2 |
| 7,445,238 B2 * | 11/2008 | Marriott .................... | 280/740 |
| 7,618,060 B2 | 11/2009 | Harvey et al. | |
| 7,648,162 B2 * | 1/2010 | Brough et al. ............. | 280/730.2 |
| 7,819,424 B2 * | 10/2010 | Toda et al. ................. | 280/730.2 |
| 7,942,441 B2 * | 5/2011 | Magnin et al. ............. | 280/740 |
| 7,963,549 B2 * | 6/2011 | Schneider et al. ......... | 280/728.2 |
| 8,006,999 B2 * | 8/2011 | Suemitsu et al. .......... | 280/730.2 |
| 8,226,117 B2 * | 7/2012 | Honold et al. ............. | 280/740 |
| 8,342,571 B2 * | 1/2013 | Baumgartner et al. .... | 280/740 |
| 8,348,305 B2 * | 1/2013 | Naruse et al. ............. | 280/743.1 |
| 8,408,582 B2 * | 4/2013 | Lunt et al. .................. | 280/728.2 |
| 2005/0189742 A1 * | 9/2005 | Kumagai et al. .......... | 280/730.2 |
| 2007/0228709 A1 * | 10/2007 | Khouri ....................... | 280/740 |
| 2010/0207368 A1 * | 8/2010 | Weyrich .................... | 280/736 |
| 2012/0056410 A1 | 3/2012 | Yamamoto | |
| 2012/0181780 A1 * | 7/2012 | Rickenbach et al. ...... | 280/730.2 |

FOREIGN PATENT DOCUMENTS

JP 9086333 A 3/1997

* cited by examiner

*Primary Examiner* — Nicole Verley
(74) *Attorney, Agent, or Firm* — Markell Seitzman

(57) ABSTRACT

An airbag includes a fabric component defining an inflatable chamber. The airbag has an opening for receiving an inflation gas. A tubular heat shield is assembled with the airbag adjacent the opening. The tubular heat shield is a sheet of a flexible material rolled to form a tube and fixed to the airbag inside the airbag. The tubular heat shield has a passage for receiving at least a portion of an inflator. The flexible material of the tubular heat shield is selected from a group of materials consisting of fabrics, polymers, metals and metal alloys.

19 Claims, 5 Drawing Sheets

Fig 7

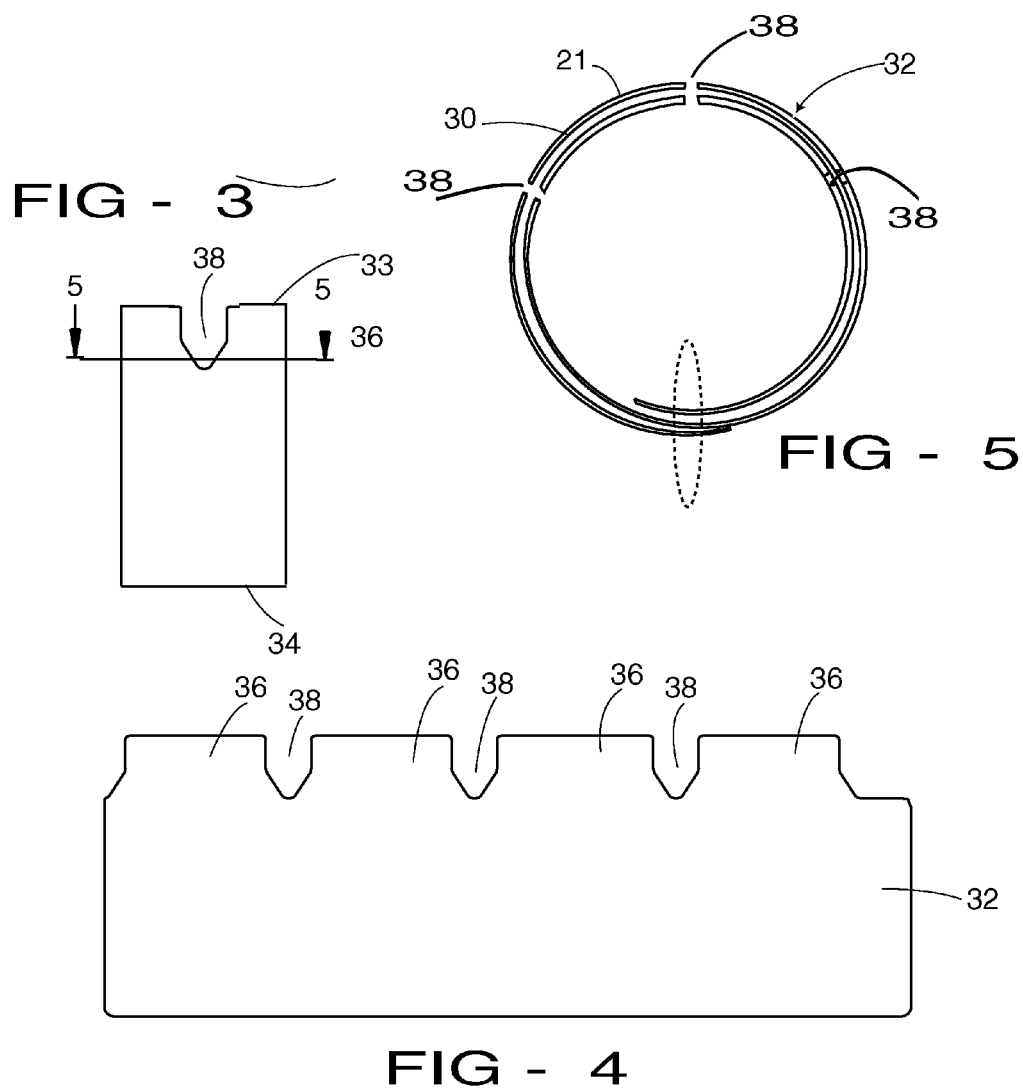

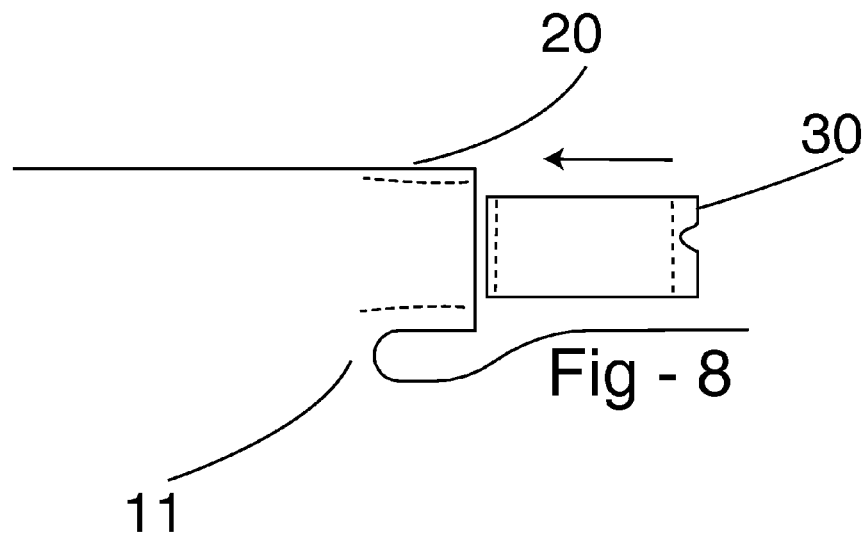
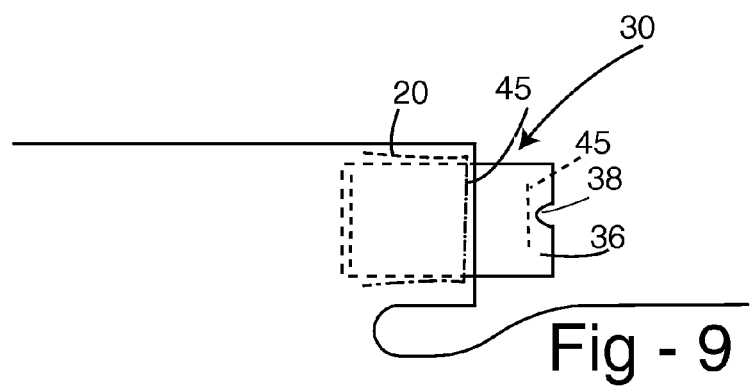
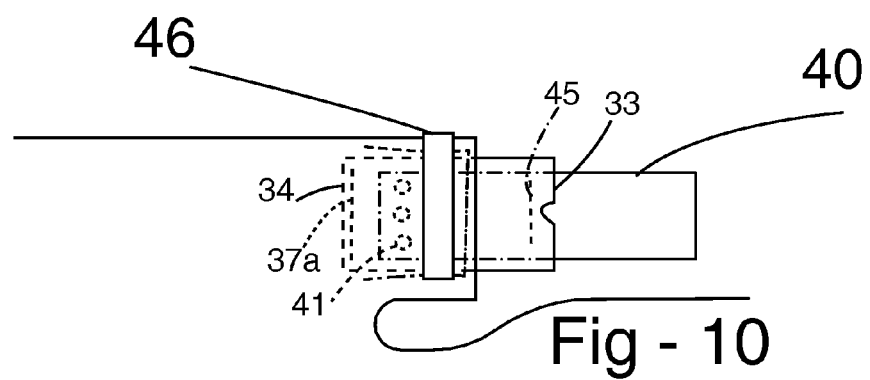

AIRBAG WITH HEAT SHIELD

FIELD OF INVENTION

The present invention relates to an airbag provided with a tubular heat shield for receiving a portion of an inflator.

BACKGROUND OF THE INVENTION

An airbag is an inflatable structure located in a vehicle that is provided with an inflation gas to cushion a vehicle occupant when the vehicle is involved in a crash of sufficient severity that the deployment of the airbag is deemed necessary. Airbags are most often made of fabric usually woven nylon or polyester; plastic film airbags has been proposed. An inflation gas may be provided by a device that burns a solid substance to generate the inflation gas, or heats gas stored in the inflator, whereby the hot inflation gas could damage the fabric of the airbag or the threads with which the airbag is stitched together. The potential problem is especially bothersome in the case of a side curtain airbag because of the large volume of gas required to inflate such a large device and that a side curtain airbag is often required to remain inflated for a longer time than airbags at other locations in a vehicle during a rollover of the vehicle. Another means employed for protecting the airbag fabric from excessively hot inflation gas is to provide a metal shield as a part of the inflator, but this can be costly and add weight to an airbag assembly. One means that has been employed for protecting the airbag fabric from excessively hot inflation gas is to provide an extra layer or layers of fabric folded onto itself and attached to the airbag fabric at a seam of the airbag fabric, but this additional folded fabric especially when it becomes distorted can impair the placement of a portion of an inflator within the layers of fabric. This added fabric might even disrupt the flow of inflation gas into the airbag. What is needed is a lightweight and effective fabric heat shield that retains a desired shape prior to and during the process of mating a portion of an inflator with the airbag and heat shield.

SUMMARY OF INVENTION

There is provided in accordance with one aspect of the invention an airbag defining an inflatable chamber, the airbag can be made from various material including woven fabric and plastic film. The airbag has an opening, also referred to as an inlet, for receiving an inflation gas. A tubular heat shield is assembled and is insertable within the airbag opening. The tubular heat shield comprises a sheet of a flexible material rolled to form a tube and fixed to the airbag inside the airbag opening. The tubular heat shield defines an open passage for receiving at least a portion of an inflator. The flexible material of the tubular heat shield is selected from a group of materials consisting of fabrics, polymers, films, thin metals and metal alloys.

There is provided in accordance with a second aspect of the invention an assembly comprising a side curtain airbag and a tubular heat shield, the side curtain airbag comprising a flexible material defining at least one inflatable chamber and provided with an opening. The tubular heat shield is a sheet of a flexible material rolled to form a tube. The tubular heat shield is fixed inside the opening (inlet) of the airbag, and the tubular heat shield has a passage for receiving at least a portion of an inflator. The tubular heat shield of the present invention can be used with all types of airbags including for example: driver, passenger, side, and knee airbags

BRIEF DESCRIPTION OF THE DRAWINGS

FIG. 3 is a side elevation view of an exemplary tubular heat shield according to one aspect of the present invention.

FIG. 4 shows a sheet of a flexible material used to fabricate the tubular heat shield.

FIG. 4a shows coated material.

FIG. 5 is a cross section of the tubular heat shield at line 5-5 of FIG. 3 and also shows an alternate embodiment.

FIGS. 8-10 illustrate various steps in the fabrication of an airbag or airbag assembly of the present invention.

DETAILED DESCRIPTION OF THE INVENTION

Figure 1:
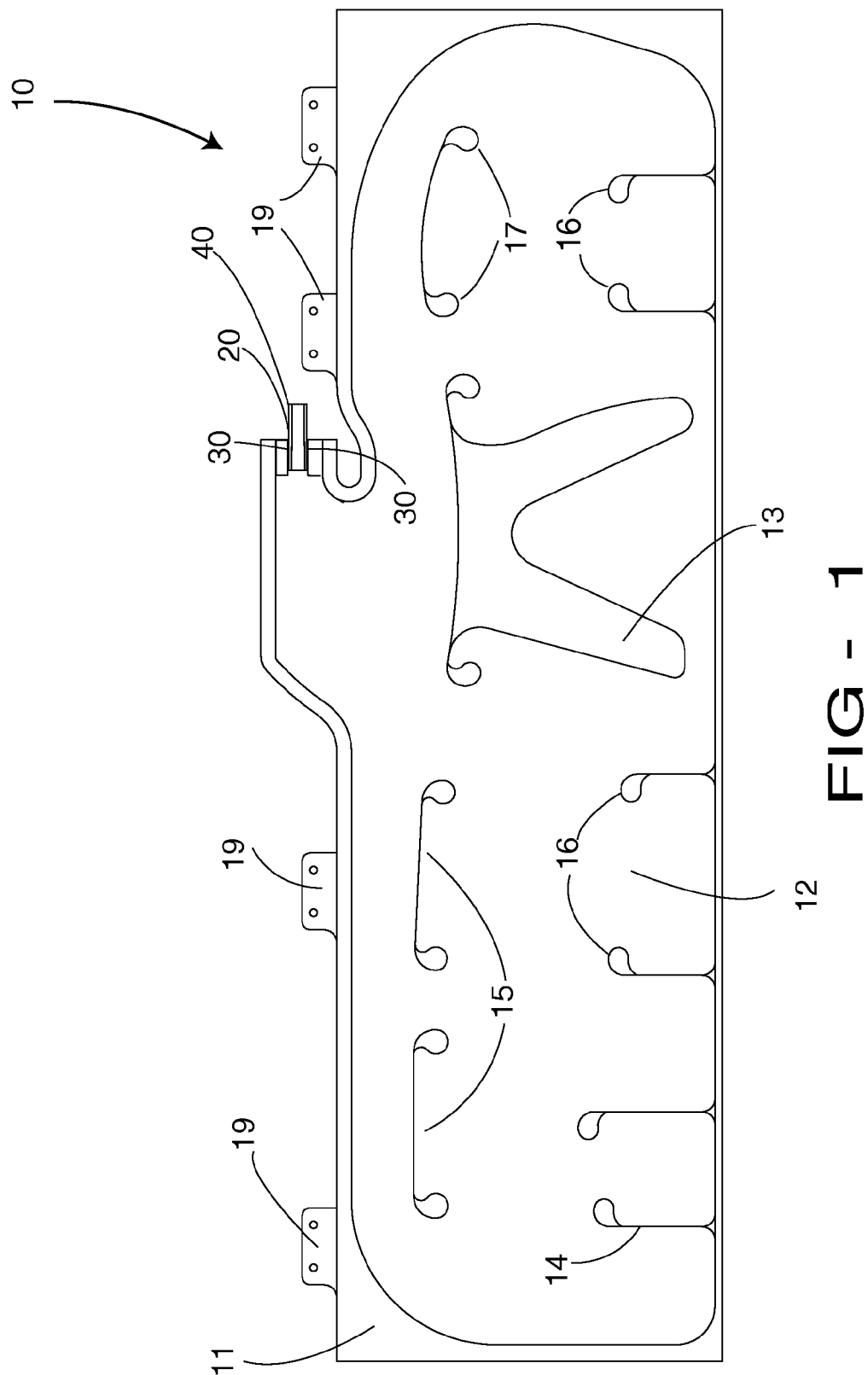
FIG. 1 is a side view of an airbag according to one aspect of the present invention.

Referring first to FIG. 1 there is shown an exemplary airbag 10 according to a first aspect of the present invention comprising a fabric component 11 defining at least one inflatable chamber 12. The exemplary airbag of FIG. 1 is an airbag of the type commonly referred to in the field of airbag technology as a side curtain airbag, but it should be appreciated the present invention may apply to other types of airbags including front impact airbags, knee airbags, side airbags and airbags employed with inflatable seatbelts. The fabric component 11 may for example comprise either two fabric sheets placed side by side and attached to one another by sewing, adhesives, welding or any other suitable means. Alternatively, the fabric component may comprise a single fabric sheet folded over onto itself to form two layers which are then attached to one another by sewing, adhesives, welding or any other suitable means. In yet another alternative fabric component suitable yarns may be knitted or woven together to form an integral, fabric component defining at least one inflatable chamber as well as the opening (inlet). It is understood the fabric component may have a structure wherein portions 13-17 of the fabric component are not inflatable to reduce the amount of inflation gas required to inflate the airbag and cause the airbag to assume a desired shape and dimensions when the airbag is inflated. The airbag may further include means for mounting the air bag to structural components of a vehicle, such as mounting tabs 19. The exemplary airbag 10 is provided with an opening 20 for receiving an inflation gas.

Figure 2:
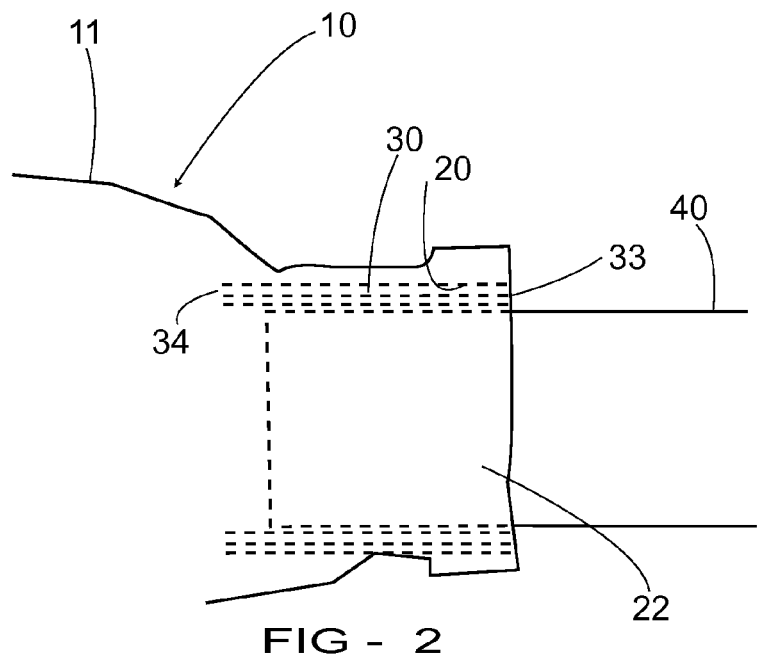
FIG. 2 is an enlarged fragmentary view of a portion of the airbag of FIG. 1 showing an opening in the airbag for receiving an inflator.

FIG. 2 is an enlarged fragmentary view of a portion of the airbag 10 of FIG. 1 showing the opening, inlet or neck 20 in the airbag for receiving an inflation gas. A tubular heat shield 30 is inserted within the opening (inlet) 20. The function of the tubular heat shield 30 is to at least reduce the possibility of damage to the fabric component 11 of the airbag by heat generated by inflator 40. As seem more clearly in FIG. 2 the inflator 40 is received in an internal passage 22 formed by multiple layers of the tubular heat shield 30. As used herein and in the claim the term "inflator" is understood to have its common meaning in the airbag technology of a source of inflation gas for inflating an airbag. An inflator used in the practice of the present invention may have any suitable structure, including pyrotechnic inflators, stored gas inflators, and hybrid inflators that provide a mixture of stored gas and gas generated by burning a suitable pyrotechnic composition.

FIG. 3 is a side elevation view of an exemplary tubular heat shield 30 according to one aspect of the present invention. FIG. 4 shows a sheet of a flexible material 32 that is used to fabricate the tubular heat shield. FIG. 5 is a cross section of the tubular heat shield 30 at line 5-5 of FIG. 3. The tubular heat shield 30 comprises a sheet 32 of a flexible material rolled to form a tube 21 and fixed to the fabric component of the airbag inside the airbag adjacent the opening 20. The flexible material of the tubular heat shield may be selected from a group of materials comprising fabrics, polymers, metals and metal alloys. The tubular heat shield has two ends 33, 34. The end 33 of is provided with a series of circumferentially spaced apart tabs 36 defining slots or openings 38. When the tube 21 is formed the slots 38 and tabs 36 respectively overlap. It is understood that the sheet 32 of flexible material comprising the tubular heat shield should have dimensions suitable to mate with the fabric component of the airbag and the exterior of the inflator in a functional manner to form a seal with the exterior of the inflator and interior of the fabric component of the airbag, and that the drawings are not to scale. In FIG. 4, four tabs 36 and three slots 38 are shows. It is inferred in FIG. 6, which is an option, that the number of slots and tabs and be greater or less than that shown in FIG. 4.

Figure 6:
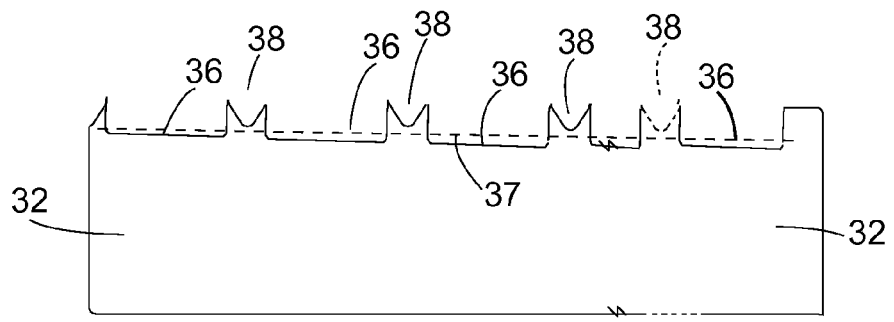
FIG. 6 shows as alternate embodiment of the invention.
Figure 7:
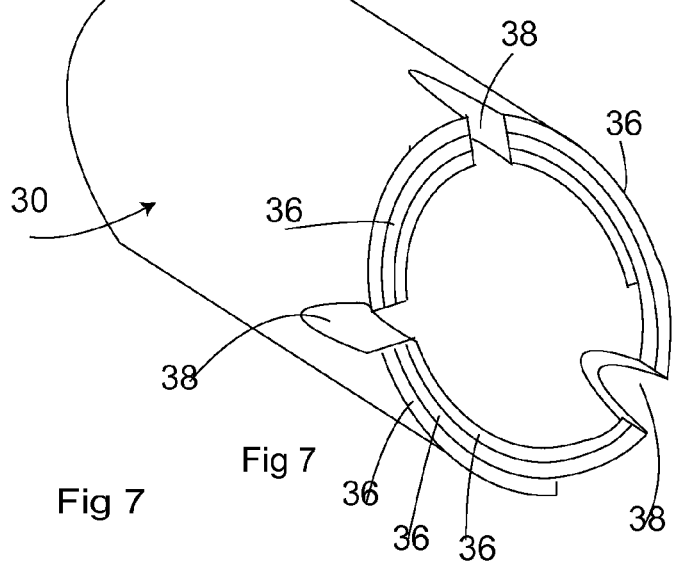
FIG. 7 is another view of a tubular heat shield

Preferably, but not an absolute necessity, a first step in fabricating a tubular heat shield 30 is to fold over the tabs 36 of the sheet of flexible material on themselves and to tack the folded-over portions down as shown in FIG. 6 using stitching 37. Of course the folded-over portions of the tabs may be tacked in place using any suitable means including, for example, adhesives and welding. Folding the tabs over on themselves makes them stiffer and less likely to be displaced when the inflator is received in the passageway 22 of the tubular heat shield. The dimensions of the tabs, both folded over and unfolded, as well as the size of the spaces 38 between what will become circumferentially next adjacent tabs in the completed tubular heat shield, can be varied in accordance with good engineering practice. Also, as an option, the layers at end 34 of the tube can also be secured by stitches 37a, practice has shown this is a requirement . . . . Next, as shown in FIG. 7, the flexible material is rolled into a tubular shape with more than one layer, preferably at least two layers, of the flexible material, as shown in FIG. 5 in cross section. Care should be taken that the tabs of each layer of fabric are circumferentially aligned with the tabs of every other layer of fabric as shown in FIG. 5. As can be appreciated, the rolled tube is formed of many layers and in one configuration the ends of the piece of material 32 overlap. In the preferred embodiment, this overlapped portion is positioned at the bottom of the tube 21 and when inserted in the opening 20, the overlapped portion is located at the bottom of the opening. As can be appreciated, this overlapped portion has an increased number of layers compared to the rest of the tube and is stiffer than the rest of the tube. As inflation gas pass through the tube into the air bag, the tube 21 have a tendency to lift upward, by positioning the overlapped region at the lowest point reduces this tendency to move upward. As shown in FIG. 8 the tubular heat shield is inserted into the fabric component of the airbag through the opening 20 in the airbag intended to allow inflation gas to be introduced into at least one inflation chamber of the airbag. When the tubular heat shield is in the intended operating location inside the airbag, as best shown in FIGS. 2 and 10, the tubular heat shield is secured in its operative position by a suitable means for attachment such as stitching 45 as shown in FIGS. 9 and 10. At least a portion of the inflator 40 may then be received in the passage 22 in the tubular heat shield as shown in FIGS. 5 and 10. In this embodiment of the invention the inserted end of the inflator with gas exit ports 41, is preferably position about 25 mm from end 34 of the tube. A clamping member 46 will often be used located adjacent at least one exterior surface of the airbag to clamp the fabric component 11 of the airbag and the tubular heat shield 30 to secure the airbag and the tubular heat shield to the inflator 40. It is desirable to have a gas tight seal around the inflator in the region of the opening 20 in the airbag to prevent inflation gas from escaping from the airbag in that region of the airbag assembly. It is understood that heat from the operation of the inflator may potentially damage portions of the fabric component of the airbag disposed nearest the inflator, and the tubular heat shield is intended to prevent or minimize such damage that could breach the integrity of the seal around the inflator and allow inflation gas to escape from the airbag in an unintended manner.

As pointed out above, the tubular heat shield comprises a flexible material selected from a group of materials consisting of fabrics, polymers, metals and metal alloys. Inasmuch as the most common fabric used in the fabrication of airbags is a polyamide, such as a nylon or polyester, it is anticipated that a preferred flexible material for the tubular heat shield will also be a polyamide or polyester. While polymers, metals and metal alloys may have a good resistance to damage by the heat generated by an inflator during activation of the inflator, when the flexible material is a nylon fabric it is desirable to fortify the flexible material against heat damage. To achieve such a structure a side of the flexible material that comprises the tubular heat shield is coated with a heat resistant compound and the flexible material is rolled to form a tube with the side of the flexible material that is coated with the heat resistant compound located nearest the passage of the tubular heat shield. It is further contemplated that wherein the flexible material that comprises the tubular heat shield has first and second sides, both sides are coated with a heat resistant compound, the first side of the flexible material being coated with a larger amount of the heat resistant compound per square meter than the second side of the flexible material, and the flexible material is rolled to form a tube with the first side of the flexible material located nearest the passage of the tubular heat shield. It is contemplated that if the base fabric comprising the tubular heat shield is a nylon or polyester fabric silicone is a good example of a heat resistant compound with which base fabric may be coated to impart improved resistance of the base fabric to damage by the heat generated when the inflator is activated. Reference is briefly made to FIG. 4a which shows the material 32 coated with coating material 32a of a first thickness on one side and with coating material 32b of a second thickness on the other side.

Figure 11:
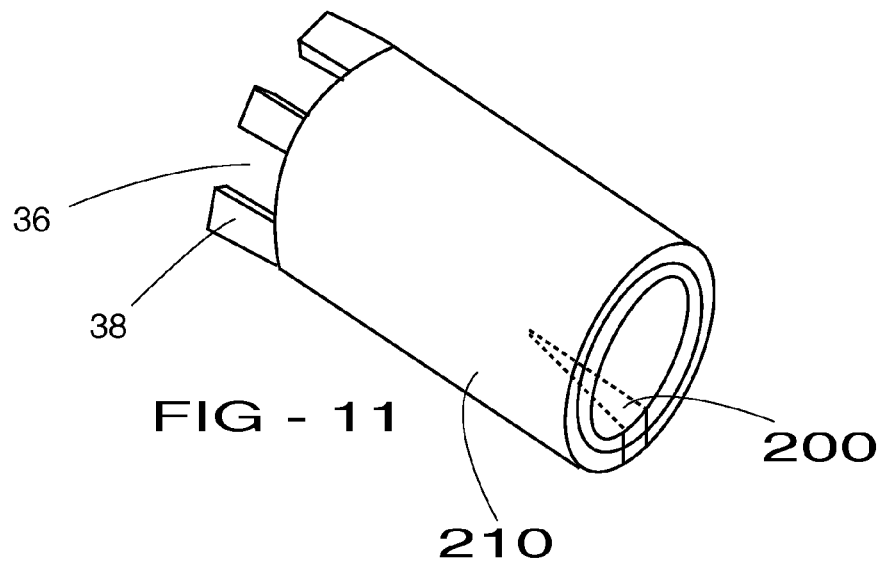
FIGS. 11, 12 and 13 show another embodiment of the invention.
Figure 12:
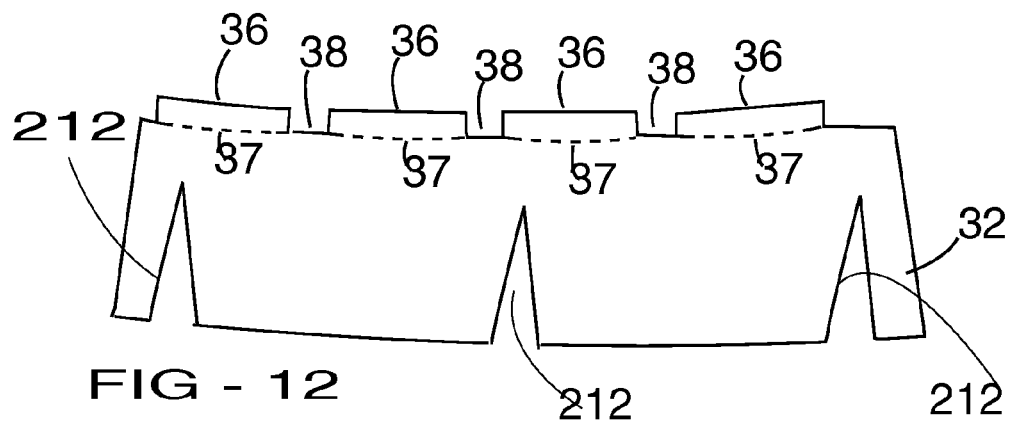
Figure 13:
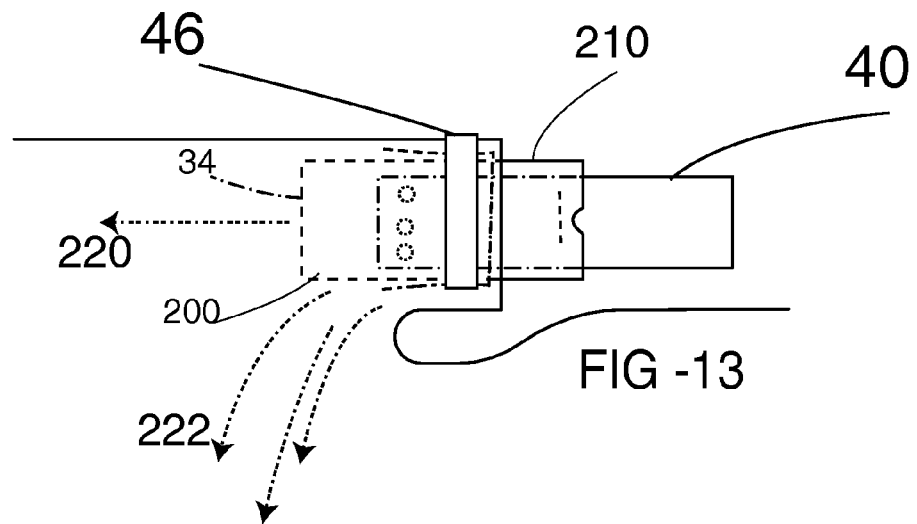

Reference is made to FIGS. 4, 5 and 6, and then to the alternative embodiment in FIGS. 11, 12 and 13. If a slit 200 was formed in the bottom of the tubular heat shield 30 of FIG. 5, the resulting heat shield 210 will have the shape as shown in FIG. 11. Instead of cutting a notch, such as a V-shape slit 200 into the tubular heat shield 30, a plurality of staged slits 212 could first be formed in the fabric 32 shown in FIG. 12. The resulting fabric configuration is illustrated in FIG. 12. If the fabric 32 in FIG. 12 were rolled, the heat shield of FIG. 11 would be created in this alternate manner. Reference is briefly made to FIG. 13 which illustrates this alternate tubular heat shield 200 positioned upon inflator 40. In FIG. 13, slit 200 is positioned toward the bottom of inflator 40 so that some inflation gas flows into the airbag in an axial manner (see arrow 220) and some of the inflation gas enters the airbag with a downward component of flow through the slit 200. In this embodiment the slit is located about 100-125 mm from the inserted end of the inflator 40.

It is also to be understood that the following claims are intended to cover all of the generic and specific features of the invention herein described, and all statements of the scope of the invention which, as a matter of language, might be said to fall there between.

What is claimed is:

1. An airbag comprising a fabric component defining an inflatable chamber, the airbag having an opening for receiving an inflation gas, a tubular heat shield assembled with the airbag adjacent the opening, the tubular heat shield comprising a sheet of a flexible material rolled to form a tube and fixed to the airbag inside the airbag, the tubular heat shield having a passage for receiving at least a portion of an inflator, the flexible material being selected from a group of materials consisting of fabrics, polymers, metals and metal alloys; and wherein the flexible material that comprises the tubular heat shield has first and second sides, both of which are coated with a heat resistant compound, the first side of the flexible material being coated with a larger amount of the heat resistant compound per square meter than the second side of the flexible material, and the flexible material is rolled to form a tube with the first side of the flexible material located nearest the passage of the tubular heat shield.

2. The airbag of claim 1 wherein the tubular heat shield has two ends, the end of the tubular heat shield located nearest to the opening of the airbag being provided with a series of circumferentially spaced apart tabs, each tab formed by material between adjacent slits.

3. The airbag of claim 1 wherein the tubular heat shield is more than one layer of the flexible material and the material between adjacent slits forms a plurality of aligned tabs in each layer of flexible material of the rolled tube.

4. The airbag of claim 3 wherein the tubular heat shield and each of the layers of the flexible material have two ends, the ends of each layer of the flexible material and the tubular heat shield that are located nearest to the opening of the airbag are provided with a series of circumferentially spaced apart tabs, the tabs of each layer of fabric being circumferentially aligned with the tabs of every other layer of fabric.

5. The airbag of claim 1 assembled with an inflator, wherein at least a portion of the inflator is received in the passage of the tubular heat shield.

6. The airbag of claim 5 wherein a clamping member that is located on at least one exterior surface of the airbag exerts a clamping force on the airbag and the tubular heat shield to secure the airbag and the tubular heat shield to the inflator.

7. The airbag of claim 1 wherein the tubular sheet shield (30) has a slit in a bottom portion thereof to encourage a downward component of flow of inflation gas.

8. An airbag comprising a fabric component defining an inflatable chamber, the airbag having an opening for receiving an inflation gas, a tubular heat shield assembled with the airbag adjacent the opening, the tubular heat shield comprising a sheet of a flexible material rolled to form a tube and fixed to the airbag inside the airbag, the tubular heat shield having a passage for receiving at least a portion of an inflator, the flexible material being selected from a group of materials consisting of fabrics, polymers, metals and metal alloys;

wherein the tubular heat shield and each of the layers of the flexible material have two ends, the ends of each layer of the flexible material and the tubular heat shield that are located nearest to the opening of the airbag are provided with a series of circumferentially spaced apart tabs, the tabs of each layer of fabric being circumferentially aligned with the tabs of every other layer of fabric; and wherein the flexible material that comprises the tubular heat shield has first and second sides both of which are coated with a heat resistant compound, the first side of the flexible material being coated with a larger amount of the heat resistant compound per square meter than the second side of the flexible material, and the flexible material is rolled to form a tube with the first side of the flexible material located nearest the passage of the tubular heat shield.

9. The airbag of claim 8 assembled with an inflator, wherein at least a portion of the inflator is received in the passage of the tubular heat shield.

10. The airbag of claim 9 wherein a clamping member that is located on at least one exterior surface of the airbag exerts a clamping force on the airbag and the tubular heat shield to secure the airbag and the tubular heat shield to the inflator.

11. An assembly comprising a side curtain airbag and a tubular heat shield, the side curtain airbag comprising a flexible material defining at least one inflatable chamber, the side curtain airbag having an opening for receiving an inflation gas for transmission to the at least one inflatable chamber when the side curtain airbag is fixed to a motor vehicle, the tubular heat shield comprising a sheet of a flexible material rolled to form a tube, the tubular heat shield being fixed to the airbag inside the airbag, the tubular heat shield having a passage for receiving at least a portion of an inflator;

wherein the flexible materials comprising the side curtain airbag and the tubular heat shield are both fabrics, and the fabric comprising the tubular heat shield has two sides with at least one of the sides coated with a heat resistant compound; and wherein the tubular heat shield comprises a single piece of fabric rolled to form a tube with the tubular heat shield having more than one layer of fabric, the tubular heat shield having first and second ends, at the first end of the tubular heat shield each of the layers of fabric is provided with a series of circumferentially spaced apart tabs, the tabs of each of the layers of fabric being circumferentially aligned with the tabs of every other layer of fabric; the first end of the tubular heat shield being located nearer to the opening of the side curtain airbag than the second end of the tubular heat shield, the single piece of fabric that comprises the tubular heat shield having two sides both of which are coated with a heat resistant compound, a first side of the fabric being coated with a larger amount of the heat resistant compound per square meter than a second side of the fabric, and the fabric is rolled to form a tube with the first side of the fabric located nearest the passage provided by the tubular heat shield.

12. The assembly of claim 11 wherein the flexible materials comprising the side curtain airbag and the tubular heat shield are selected from a group of materials consisting of fabrics, polymers, metals and metal alloys.

13. The assembly of claim 11 wherein the flexible materials comprising the side curtain airbag and the tubular heat shield are both fabrics, and the fabric comprising the tubular heat shield has two sides with at least one of the sides coated with a heat resistant compound.

14. The assembly of claim 13 wherein the side curtain airbag further comprises a filling tube for transmitting inflation gas to the at least one inflatable chamber, the filling tube communicating with the opening in the airbag, and the tubular heat shield being located inside the filling tube adjacent the opening in the airbag.

15. The assembly of claim 14 further comprising an inflator, wherein at least a portion of the inflator is received in the passage of the tubular heat shield, and a clamping member that is located adjacent at least one exterior surface of the airbag exerts a clamping force on the airbag and the tubular heat shield to secure the airbag and the tubular heat shield to the inflator.

16. The assembly of claim 11 further comprising an inflator, wherein at least a portion of the inflator is received in the passage of the tubular heat shield, and a clamping member that is located adjacent at least one exterior surface of the airbag exerts a clamping force on the airbag and the tubular heat shield to secure the airbag and the tubular heat shield to the inflator.

17. The assembly of claim 11 further comprising an inflator, wherein at least a portion of the inflator is received in the passage of the tubular heat shield, and a clamping member that is located adjacent at least one exterior surface of the airbag exerts a clamping force on the airbag and the tubular heat shield to secure the airbag and the tubular heat shield to the inflator.

18. The assembly of claim 11 further comprising an inflator, wherein at least a portion of the inflator is received in the passage of the tubular heat shield, and a clamping member that is located adjacent at least one exterior surface of the airbag exerts a clamping force on the airbag and the tubular heat shield to secure the airbag and the tubular heat shield to the inflator.

19. The assembly of claim 11 wherein the tubular sheet shield (30) has a slit in a bottom portion thereof to encourage a downward component of flow of inflation gas.

* * * * *